April 14, 1964  IKURO KUMEZAWA  3,128,858
COMPOSED CATENARY OVERHEAD CONTACT WIRE SYSTEMS
Filed Feb. 27, 1961  4 Sheets-Sheet 1

IKURO KUMEZAWA
INVENTOR.

BY Wenderoth, Lind
and Ponack
ATTORNEYS

IKURO KUMEZAWA
INVENTOR.

3,128,858
COMPOSED CATENARY OVERHEAD CONTACT
WIRE SYSTEMS
Ikuro Kumezawa, Tokyo, Japan, assignor to N.H.K.
Spring Co., Ltd., Yokohama, Japan, a corporation of
Japan
Filed Feb. 27, 1961, Ser. No. 91,876
2 Claims. (Cl. 191—41)

This invention relates to catenary suspension trolley wires, and more particularly to composed catenary overhead contact wires adapted for use in current collection for high speed electric cars or trains.

An object of the present invention is to provide composed catenary overhead contact wires for high speed electric cars or trains, in which contact breaks between pantograph pans and trolley wires do not occur even at high running speeds of cars or trains over about 150 km./hour.

Another object of the present invention is to provide systems for preventing contact break phenomena from occurring between catenary suspension trolley wires and pantograph pans for high speed electric cars and trains.

There are other objects and particularities of the present invention, which will be made obvious from the following detailed description of the present invention with reference to the accompanying drawings, in which.

Figure 1:
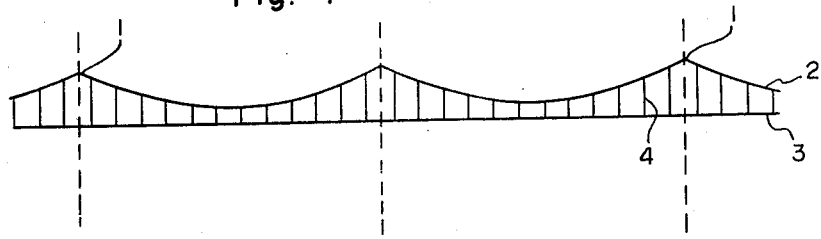
FIG. 1 is a diagrammatic representation of a conventional simple catenary trolley wire.

A conventional simple catenary suspension trolley wire for electric cars as shown in FIG. 1 comprises a series of catenary supporting points 1, messenger wires 2, and a trolley wire 3 suspended from the messenger wires by means of a requisite number of hangers 4 of varying length, as is well known.

Figure 2:
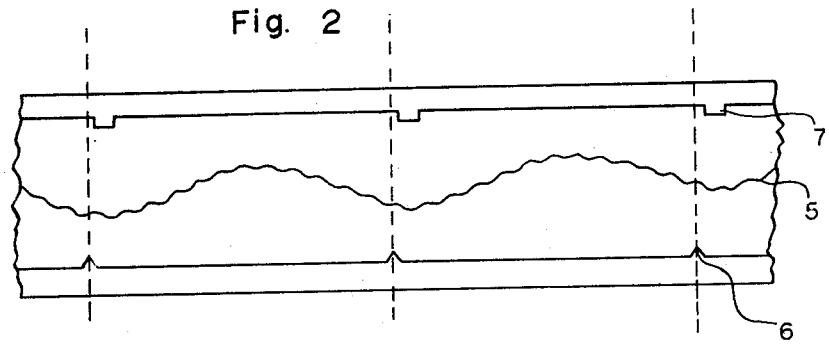
FIG. 2 is a reproduction of an oscillogram showing the relation between the movement of a pantograph pan and the contact break phenomena when the former travels along a trolley wire shown in FIG. 1 for collecting electric current therefrom.

As a pantograph pan of an electric car travels along and in contact with the simple catenary trolley wire shown in FIG. 1, the pantograph pan moves along an up-and-down fluctuating curve 5 of FIG. 2. The pan moves down near each catenary supporting point 1 and up between two adjacent supporting points 1. The upward movement is a maximum near the central portion of the span. In FIG. 2, the curve 5 represents the change in the height of the pantograph pan, 6 shows the points of beam supporting posts, and 7 show the contact break phenomena. It is to be noted that the pantograph pan, in addition to the large amplitude oscillations in successive spans, has ripple-like up and down movements imparted to it as it passes below each hanger 4.

As the pantograph speed increases more and more, the periods of its up and down oscillation become shorter and shorter, so that, after the speed has reached a certain limit, the pantograph pan cannot keep continuous contact with the trolley wire due to the kinetic inertia of the pantograph at the extremities of the downward movements of the pan, and hence the contact break phenomena 7 are inevitable.

Figure 3:
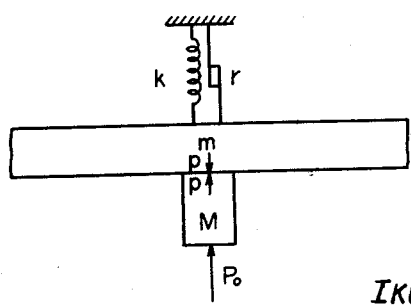
FIG. 3 is a diagram showing an equivalent mechanism of current collecting contact between a pantograph pan and a trolley wire.

We now consider the contact break phenomena from a theoretical standpoint as below. By a study of the dynamic nature of the catenary suspension trolley wire, we have established an equivalent system in which the trolley wire is supported by a series of springs having successively varying spring constants, or such a trolley wire may be considered a conductor having a continuously varying equivalent mass, neglecting inherent mechanical resistance of the trolley wire that acts to absorb its own oscillation. In FIG. 3, M represents the equivalent mass of the pantograph which acts to lift with a force Po, a trolley wire having equivalent mass $m$ and spring constant $k$ distributed along the trolley wire.

Assuming that the pantograph pan and the trolley wire are in contact with each other with a contact pressure $p$, and taking $x$ and $y$ as coordinates in the directions of movements of car movement and up and down movement in the system respectively and $t$ as the time, then we obtain the following equations:

$$m\frac{d^2y}{dt^2} = p - ky$$

or $$mV^2\frac{d^2y}{dx^2} = p - ky \qquad (1)$$

where $$V = \frac{dx}{dt}$$

which may be called "current collecting speed." We can also obtain an equation $$M\frac{d^2y}{dt^2} = Po - p$$

or $$MV^2\frac{d^2y}{dx^2} = Po - p \qquad (2)$$

Then, $$(m+M)V^2\frac{d^2y}{dx^2} = Po - ky \qquad (3)$$

If $m$ and $k$ are constant, from Equation 3, $$y = \frac{Po}{k}\left(1 - \cos\frac{x}{\frac{V\sqrt{M+m}}{k}}\right) \text{ or } \frac{Po}{k}$$

From Equation 2, $$p = Po\left(1 - \frac{M}{M+m}\cos\frac{x}{\frac{V\sqrt{M+m}}{k}}\right) \text{ or } Po$$

As $$\frac{M}{M+m}\cos\frac{x}{\frac{V\sqrt{M+m}}{k}}$$

is smaller than unity, $p$ is always larger than zero, that is to say, the contact break phenomenon never occurs.

Figure 4:
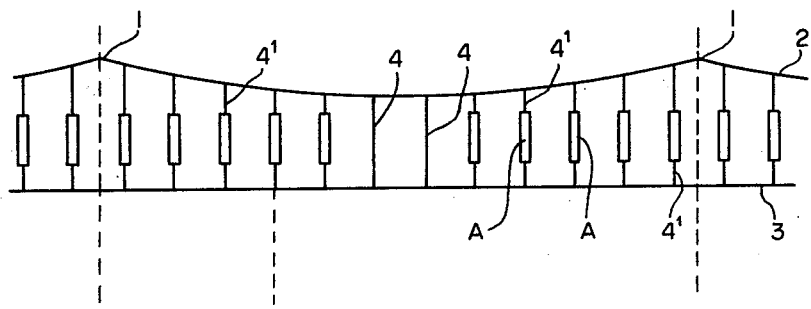
FIG. 4 is a diagrammatic representation of a composed catenary trolley wire system embodying the present invention somewhat ideally drawn for convenience of explanation of the theory of invention in connection with FIG. 5.
Figure 5:
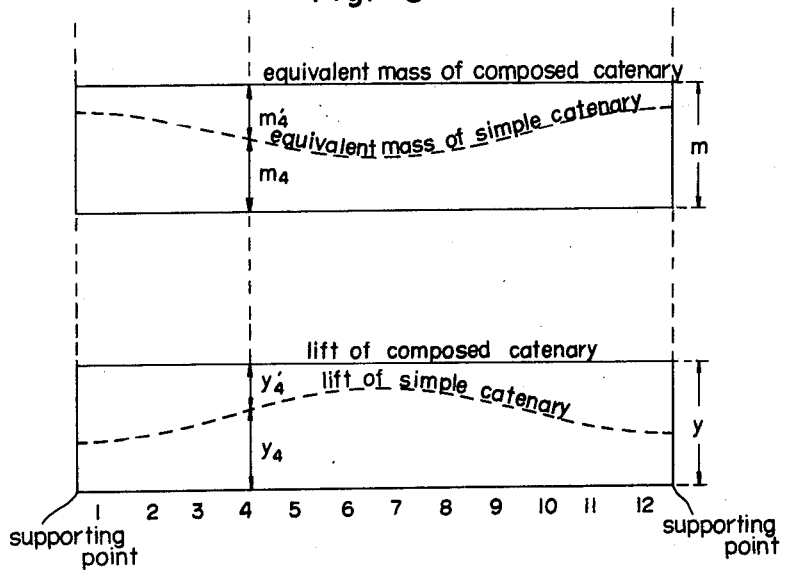
FIG. 5 is a diagram for explaining the theory of the present invention in determining equivalent mass of a composed catenary element and a spring constant employed in the present invention.

In a simple catenary trolley wire as shown in FIG. 1, for example, the equivalent mass and amount of lift (lift force divided by spring constant) varies as actually measured along the trolley wire as shown by dotted curves in FIG. 5. Thus, it will be readily understood that, if a series of composed catenary elements A are associated with respective portions of the trolley wire as shown in FIG. 4, each element having an appropriately determined equivalent mass and spring constant, we can provide a nondetaching composed catenary trolley wire system having constant and uniformly distributed equivalent masses and spring constants all along the trolley wire. In practice, each composed catenary element A should additionally comprise a mechanical resistance member for absorbing oscillation energy.

In FIG. 4, the composed catenary overhead contact wire system comprises a series of catenary supporting points 1, messenger wires 2 and a trolley wire 3 suspended from the messenger wires by means of a requisite number of hangers, certain of them 4 being ordinary wire hangers, while the rest of the hangers 4′ are composed catenary elements A, respectively.

The above-mentioned theory of the present invention also applies to droppers or lower portions of rigid bodies of compound catenary trolley wire systems when composed catenary elements A are associated therewith.

Figure 6:
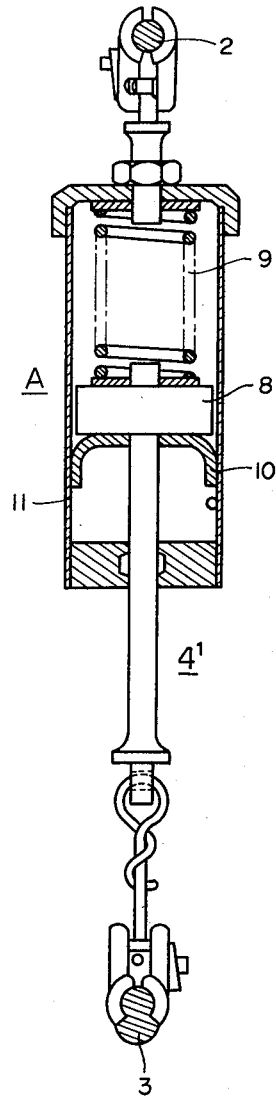
FIG. 6 is a side elevational view, partly in section, of an example of the composed catenary element.

A practical example of composed catenary element A is shown in FIG. 6. Referring to FIG. 6, the element A comprises a member 8 for providing the equivalent mass, a coil spring 9 for providing the spring constant, and a mechanical resistance member in the form of curved resilient plate 10 for absorbing oscillation energy of the trolley wire by virtue of the frictional sliding engagement under pressure of member 10 with the inner wall of a cylindrical casing 11 enclosing all the above-enumerated members. The coil spring 9 is fixed at the opposite ends to the top cap of casing 11 and the equivalent mass member 8, respectively. The casing 11 is connected to the messenger wire 2 by a suitable known device, while the members 8 and 10 are connected to the trolley wire 3 by a suitable known device, as illustrated.

Figure 7:
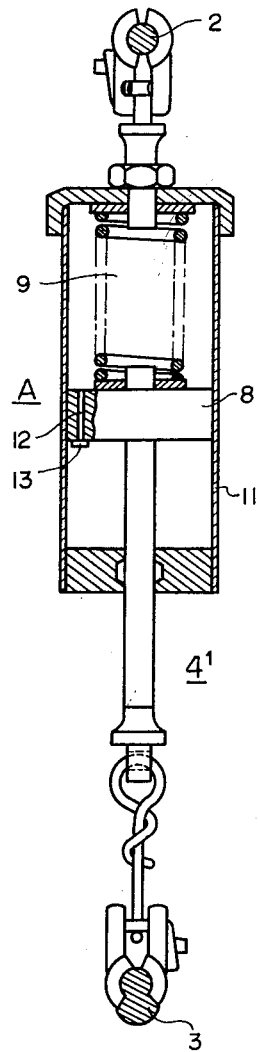
FIG. 7 shows another example of the composed catenary element.

The mechanical resistance member 10 may alternatively take any other known forms, such as oil damping devices, air damping devices, etc. FIG. 7 shows a composed catenary member A employing an air damping device as the mechanical resistance member. The device comprises a passage way 12 formed through the equivalent mass member 8, and a valve 13 for controlling the passage way. During the upward movement of trolley wire, the valve 13 opens to permit free flow of air from above to below the member 8, but during the downward movement of trolley wire, the valve 13 closes, and the air in the closed chamber formed below the member 8 can flow into the chamber formed above the member 8 at a limited rate of leakage only around the member 8 or through a restricted orifice, not shown, provided in the member 8.

Figure 8:
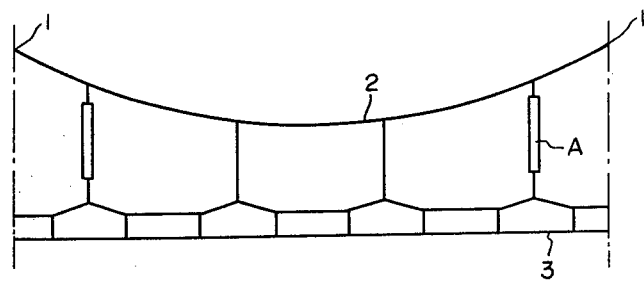
FIG. 8 shows diagrammatically an embodiment of the present invention as applied to a compound catenary suspension.
Figure 9:
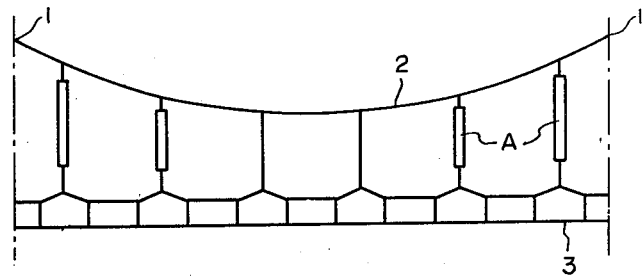
FIG. 9 shows diagrammatically another embodiment of the invention.

The respective equivalent mass members 8 and the respective spring constant members 9 are designed appropriately for obtaining a constant and substantially uniform distribution of mass and spring constant all along the trolley wire as hereinbefore discussed. The respective damping members 10 are also designed appropriately for proper absorption of the oscillation energy of the trolley wire at the respective points. FIGS. 8 and 9 show practical examples of composed catenary overhead contact wires as applied to compound catenary systems according to the present invention provided with composed catenary elements A at required locations.

I claim:

1. A trolley wire suspension composite catenary element for use in a composite catenary overhead contact wire system, comprising a member having a measured mass, a spring means having a measured spring constant and attached to said member and adapted to be connected to a messenger wire in the wire system, and a mechanical resistance means connected to said member for absorbing the oscillation energy of a trolley wire suspended from the messenger wire by said element.

2. An element as claimed in claim 1 which further comprises a casing in which said member and said spring means are housed, said mechanical resistance means having said casing as a part thereof.

References Cited in the file of this patent

UNITED STATES PATENTS

| | | |
|---|---|---|
| 923,851 | Kempton | June 8, 1909 |
| 1,592,369 | Jorstad | July 13, 1926 |
| 1,766,873 | Birch | Jan. 24, 1930 |
| 1,834,659 | Teramoto | Dec. 1, 1931 |

FOREIGN PATENTS

| | | |
|---|---|---|
| 284,112 | Germany | May 8, 1915 |